United States Patent Office 2,697,728
Patented Dec. 21, 1954

2,697,728
ALICYCLIC QUATERNARY AMMONIUM SALTS

Charles F. Huebner, Morristown, N. J., assignor to Ciba Pharmaceutical Products, Incorporated, Summit, N. J., a corporation of New Jersey No Drawing. Application July 16, 1951,
Serial No. 237,053

11 Claims. (Cl. 260—567.6)

This invention relates to new alicyclic quaternary ammonium salts and to the preparation thereof.

A primary object of the invention is the embodiment of a new group of compounds characterized by a potent curare-like activity and by freedom from undesired side effects such as hypotension or respiratory paralysis.

This object is realized, according to the present invention, by a new group of alicyclic quaternary amines which correspond to the formula $$\begin{array}{ccc} R & CH_2-CH_2 & CH_2-CH_2 & R \\ R-N-CH & CH-(CH_2)_n-CH & CH-N-R \\ R^1 \; X & CH_2-CH_2 & CH_2-CH_2 & X \; R^1 \end{array}$$

wherein R stands for a lower alkyl group, such as methyl, ethyl, propyl, butyl, etc., $R^1$ stands for a lower alkyl group (which may be the same as or different from the lower alkyl group represented by R) or for an aralkyl radical, such as benzyl, alkylated benzyl, alkoxylated benzyl, halogenated benzyl, etc., X stands for a halogen atom as, for example, a chlorine, bromine or iodine atom, and $n$ stands for one of the numbers 0, 1 and 2. These compounds fulfill the aforementioned desiderata in that, in addition to a high curare-like activity, they do not cause the aforesaid undesired side effects. The new compounds are thus useful therapeutically, and may be administered intramuscularly, intravenously or orally.

A further object of the invention is the embodiment of efficient methods for the preparation of the said alicyclic quaternary ammonium salts. This object is realized according to the present invention, for example by hydrogenating an appropriate amine of the formula $$\begin{array}{c} R^2 \\ \diagdown \\ N-\!\!\!\!\!-\langle\;\;\rangle-\!(CH_2)_n-\!\langle\;\;\rangle-\!\!\!\!\!-N \\ R^2 \;\;\;\;\;\;\;\;\;\;\;\;\;\;\;\;\;\;\;\;\;\;\;\;\;\;\;\;\;\;\;\;\; R^2 \end{array}$$

wherein $R^2$ may be H or lower alkyl, and $n$ is one of the numbers 0, 1 and 2, until the phenyl rings are fully reduced, i. e. saturated. In those cases where $R^2$ is H, the amino groups are then methylated, with the aid of a suitable methylating agent such as formaldehyde and formic acid. Where $R^2$ is lower alkyl, such for instance as ethyl, propyl or the like, the fully reduced tertiary amines are obtainable directly on reduction according to this invention. In either case, the resultant saturated and alkylated product is then quaternized, with the aid for example of an appropriate lower alkyl halide such as methyl iodide, methyl chloride, ethyl bromide or ethyl iodide or of an aralkyl halide such as benzyl bromide or benzyl chloride.

The hydrogenation is, according to the invention, carried out at room temperature (about 20–30° C.) over a hydrogenation catalyst, which may be a noble metal such as platinum or palladium, in a solvent such as acetic acid, or over Raney nickel in alcohol at superatmospheric pressure and elevated temperature.

In certain cases, as in cases of especially convenient accessibility, other starting materials than the aromatic diamines can be employed. Thus, the intermediate of the formula $$\begin{array}{ccc} H_3C & CH_2-CH_2 & CH_2-CH_2 & CH_3 \\ \diagdown N-CH & CH-CH_2-CH & CH-N \diagup \\ H_3C & CH_2-CH_2 & CH_2-CH_2 & CH_3 \end{array}$$

can be prepared conveniently by the hydrogenation of 4,4'-bis(dimethylamino)-benzophenone, which undergoes complete reduction of the ketone group in the same operation that causes hydrogenation of the aromatic rings. Similarly, the intermediate of the formula $$\begin{array}{ccc} CH_2-CH_2 & CH_2-CH_2 \\ H_2N-CH & CH-CH_2-CH_2-CH & CH-NH_2 \\ CH_2-CH_2 & CH_2-CH_2 \end{array}$$

is produced by the complete reduction of 4,4'-dinitrostilbene, the nitro groups being reduced to amino groups in the same operation which effects the hydrogenation of the aromatic rings and of the ethylenic double bond. The respective intermediate is quaternized as previously set forth.

The following examples set forth representative exemplary embodiments of the invention, and these examples are intended to be solely illustrative and not at all limitative. In these examples, parts by weight bear the same relation to parts by volume as does the kilogram to the liter. Temperatures are expressed in degrees centigrade. Percentages are by weight. All melting points are uncorrected.

Example 1

100 parts by weight of benzidine:

$$H_2N-\!\!\!\!\!-\langle\;\;\rangle-\!\langle\;\;\rangle-\!\!\!\!\!-NH_2$$

in 1000 parts by volume of glacial acetic acid are hydrogenated at a temperature of about 20–30° and under a pressure of 50 pounds per square inch in the presence of 5 parts by weight of platinum oxide. When the theoretical amount of hydrogen for complete saturation has been consumed, hydrogenation is discontinued. Thereupon, after removing the catalyst by syrup is dissolved in 100 parts by volume of water. The resulting solution is then made strongly alkaline with sodium hydroxide or potassium hydroxide and the water-insoluble free base (bicyclohexyl-4,4'-diamine):

$$\begin{array}{ccc} CH_2-CH_2 & CH_2-CH_2 \\ H_2N-CH & CH-CH & CH-NH_2 \\ CH_2-CH_2 & CH_2-CH_2 \end{array}$$

extracted with n-butanol. The solvent is then removed from the extract by distillation, and to the residue are added 200 parts by volume of ethanol, 102 parts by volume of formic acid and 272 parts by volume of 36% aqueous formaldehyde, after which the mixture is refluxed for three hours. The solvents are then distilled off, and the residue dissolved in water, made strongly alkaline with caustic soda, and extracted with chloroform or butanol. The solvent is removed from the extract by distillation and the residue distilled at 0.8 millimeter pressure, whereupon the tertiary base:

$$\begin{array}{ccc} H_3C & CH_2-CH_2 & CH_2-CH_2 & CH_3 \\ \diagdown N-CH & CH-CH & CH-N \diagup \\ R_3C & CH_2-CH_2 & CH_2-CH_2 & CH_3 \end{array}$$

which boils at 150–160° is obtained.

10 parts by weight of the thus-obtained base are dissolved in 50 parts by volume of ethanol, and 7.5 parts by volume of methyl iodide are then added to the solution. After standing for several hours at room temperature, ethyl acetate is added to complete the crystallization of the formed bis quaternary salt. Recrystallization from a 90% aqueous ethanol-ethyl acetate mixture gives the (bicyclohexyl)-4,4'-bis-(trimethylammonium iodide):

$$\begin{array}{ccc} H_3C & CH_2-CH_2 & CH_2-CH_2 & CH_3 \\ H_3C-N-CH & CH-CH & CH-N-CH_3 \\ H_3C \; I & CH_2-CH_2 & CH_2-CH_2 & I \; CH_3 \end{array}$$

which melts at 310–311° (with decomposition).

Methylation and quaternization of the crude primary hydrogenated base mentioned eaarlier in this example may be carried out alternatively as follows: 10 parts by weight of the base (bicyclohexyl-4,4'-diamine) in 100 parts by volume of acetone are stirred while refluxing with 27 parts by volume of methyl iodide and 25 parts by weight of dry silver oxide for four hours. The solvent is removed under reduced pressure and the quaternary salt extracted from the silver salts with 100 parts by volume of 90% aqueous ethanol. On adding ethyl acetate to the hot solution until turbidity appears and cooling, (bicyclohexyl)-4,4'-bis-(trimethylammonium iodide) is obtained.

*Example 2*

The compound, p,p'-methylenedianiline, of the formula:

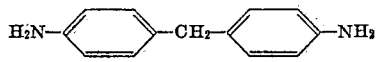

is hydrogenated and methylated according to the prescriptions of Example 1, use being made of an equivalent quantity (about 108 parts by weight) of the said p,p'-methylenedianiline and corresponding amounts of the other reagents, whereupon the corresponding methylene-4,4'-bis-(N,N-dimethyl-cyclohexylamine):

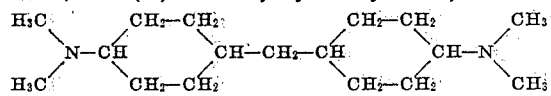

which boils at 130–140° at a pressure of 0.2 millimeter, is obtained.

Quaternization of the thus-obtained product, in accordance with the quaternization prescriptions set forth in Example 1, yields methylene-bis-[(4-cyclohexyl)-trimethylammonium iodide]:

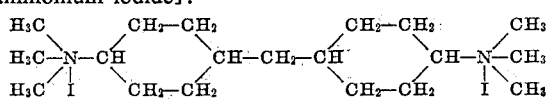

which melts at 260 (with decomposition).

1 part by weight of the above quaternary ammonium salt is shaken for 12 hours with 5 parts by weight of freshly prepared silver chloride. The silver salts are removed and the aqueous filtrate concentrated to dryness. The non-crystalline methylene-bis-[(4-cyclohexyl)-trimethylammonium chloride] thus obtained is freely soluble in water.

*Example 3*

10 parts by weight of methylene-4,4'-bis-(N,N-dimethyl-cyclohexyl-amine) obtained as described in Example 2 are refluxed for 15 minutes with 9 parts by volume of benzyl bromide in 50 parts by volume of ethanol. Ethyl acetate is added to the cooled solution until crystallization occurs. Recrystallization from ethanol-ethyl acetate yields methylene-bis-[benzyl-(4-cyclohexyl)-dimethylammonium bromide]:

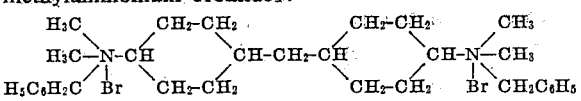

which melts at 153° (with decomposition).

*Example 4*

The compound, 4,4'-dinitrostilbene, of the formula:

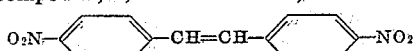

is hydrogenated and methylated according to the prescriptions of Example 1, using an equivalent quantity (about 163 parts by weight) of the 4,4'-dinitrostilbene and corresponding amounts of the other reagents, whereupon ethylene-4,4'-bis-(N,N-dimethyl-cyclohexylamine):

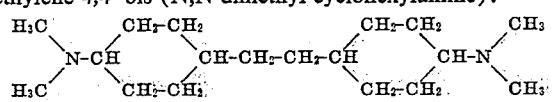

which boils at 170–180° at 0.2 millimeter pressure, is obtained.

Quaternization of the thus-obtained product with methyl iodide according to the prescriptions of Example 1, last paragraph, yields ethylene-bis-[(4-clyclohexyl)-trimethylammonium iodide]:

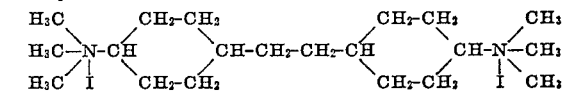

which melts at 340° (with decomposition).

*Example 5*

20 parts by weight of N,N,N',N'-tetramethylbenzidene:

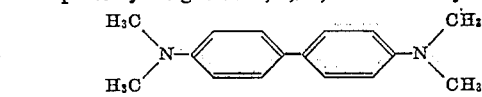

in 200 parts by volume of glacial acetic acid are hydrogenated at a temperature of about 20–30° and a pressure of about 50 pounds per square inch in the presence of 5 parts by weight of platinum oxide. When the theoretical amount of hydrogen for complete saturation has been consumed, hydrogenation is discontinued, the catalyst is filtered off, and the solvent removed from the filtrate by distillation. The residue is dissolved in 50 parts by volume of water and the solution made strongly basic with sodium hydroxide or potassium hydroxide. The formed free base is then extracted from the solution with the aid of n-butanol. After removal of the n-butanol by distillation from the obtained extract, the residual base may be directly used for further reaction.

5 parts by weight of the said base are treated with 4.5 parts by weight of benzyl bromide, after the manner described [in connection with methylene-4,4'-bis-(N,N-dimethylcyclohexylamine)] in Example 3. The thus-obtained product is recrystallized from a 90% aqueous ethanol-ethyl acetate mixture to yield bicyclohexyl-4,4'-bis-(benzyldimethylammonium bromide):

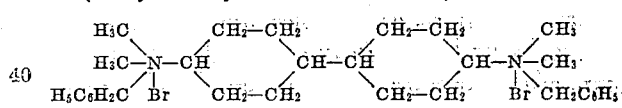

which melts at 278–279° (with decomposition).

5 parts by weight of the hydrogenated base obtained as described in this example are refluxed with 7.6 parts by weight of p-methoxybenzyl bromide in 25 parts by volume of ethanol for 15 minutes. Addition of ethyl acetate causes the quaternary salt to separate in a crystalline condition. Recrystallization from a 90% aqueous ethanol-ethyl acetate mixture yields bicyclohexyl-4,4'-bis-(p-methoxybenzyldimethylammonium bromide) of the formula

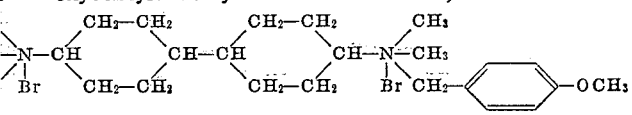

*Example 6*

20 parts by weight of 4,4'-bis-(dimethylamino)-benzophenone:

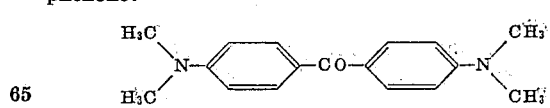

are hydrogenated to saturation in glacial acetic acid and in the presence of platinum oxide, after the prescriptions of Example 5, and the hydrogenated base recovered as described in the latter.

The same base is obtained by subjecting 20 parts by weight of methylene-4,4'-bis-(N,N-dimethyl-cyclohexyl-amine):

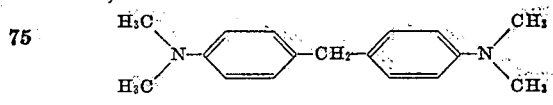

to hydrogenation under the same conditions. An equal weight of palladium oxide may be substituted for the platinum oxide with the same results.

Reaction of the said base with an equivalent quantity of methyl iodide gives methylene-bis-[(4-cyclohexyl)-trimethylammonium iodide], identical with the product obtained according to Example 2.

Example 7

5 parts by weight of the hydrogenated base:

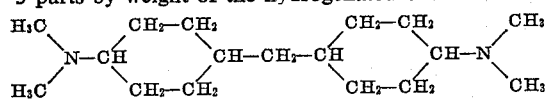

as obtained in Example 6 are dissolved in 25 parts by weight of ethanol, and the solution treated with 10 parts by weight of ethyl iodide. After allowing the thus-treated solution to stand for several hours at room temperature, ethyl acetate is added to complete the crystallization of the formed quaternary salt. Recrystallization of the latter from ethanol ethyl acetate yields methylene-bis-[(4-cyclohexyl)-ethyldimethylammonium iodide]:

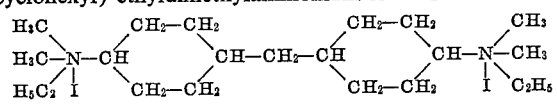

which melts at 257–258° (with decomposition).

Example 8

The 20 parts by weight of 4,4'-bis-(dimethylamino)-benzophenone of Example 6 are replaced by an equivalent quantity of 4,4'-bis-(diethylamino)-benzophenone, while otherwise proceeding to the production and recovery of a hydrogenated base according to the prescriptions of the said example. Reaction of the thus-prepared hydrogenated base with the corresponding amount of ethyl iodide, and recrystallization from ethanol of the thus-produced quaternary salt yields methylene-bis-[(4-cyclohexyl)-triethylammonium idoide]:

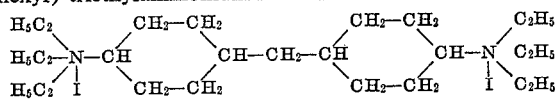

which melts at 238–240° (with decomposition).

By replacing the ethyl iodide, used in the preceding paragraph, by a corresponding quantity of methyl iodide, and otherwise proceeding as described in the said paragraph, there is obtained the corresponding methylene-bis-[(4-cyclohexyl)-diethylmethylammonium iodide]:

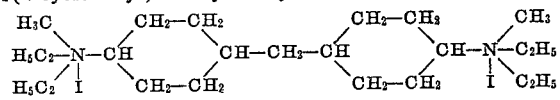

which melts at 256–257° (with decomposition).

Methylene - bis - [(4 - cyclohexyl) - diethylmethylammonium iodide] may be prepared alternatively as follows:

10 parts by weight of the base obtained by the hydrogenation of p,p'-methylenedianiline as described in Example 2 are dissolved in 100 parts by volume of ethanol containing 13.3 parts by weight of freshly distilled acetaldehyde and 5 parts by volume of acetic acid. The mixture is hydrogenated in the presence of 0.5 part by weight of platinum oxide at 50 lbs./square inch pressure. After completion of the hydrogenation, the free tertiary base is recovered as described in Example 5. On reaction with methyl iodide, methylene-bis-[(4-cyclohexyl)-diethylmethylammonium iodide] is obtained, which melts at 256–257° (with decomposition).

Example 9

100 parts by weight of benzidine in 500 parts by volume of ethanol are hydrogenated, in the presence of Raney nickel, at a temperature of 185° and under a pressure of 2000 pounds per square inch for 12 hours, when the hydrogenation is complete. The catalyst is then removed from the solution and the alcohol is distilled off from the latter. The thus-obtained base is then distilled at 160–165° at a pressure of 0.2 mm., whereupon it is reacted with methyl iodide as described in Example 1, and the resultant quaternated product recrystallized from a mixture of 90% aqueous ethanol and ethyl acetate, yielding bicyclohexyl - 4,4' - bis - (diethylmethylammonium iodide):

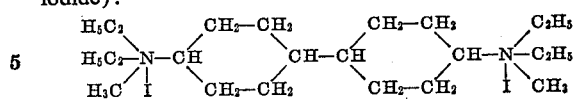

which melts at 299–300° (with decomposition).

Example 10

In lieu of the benzidine employed in Example 9, an equivalent quantity of p,p'-methylene-bis-(N,N-diethylaniline) is hydrogenated under the conditions set forth in the said example. The catalyst is removed from the solution by filtration, and the alcohol is removed from the solution by distillation. The residual hydrogenated base is reacted with methyl iodide under the conditions set forth in Example 1. The thus-obtained methylene-bis-[(4-cyclohexyl)-trimethylammonium iodide]:

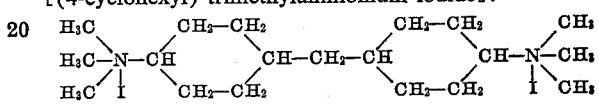

melts at 260–261° (with decomposition).

By reacting the hydrogenated base of the preceding paragraph with benzyl bromide, after the manner described in Example 3, there is obtained methylene-bis-[benzyl-(4-cyclohexyl)-dimethylammonium bromide]:

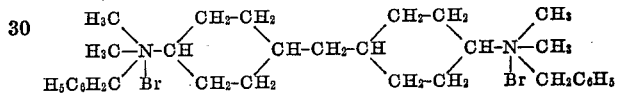

which melts at 257–258°.

By refluxing 1 part by weight of the hydrogenated base of the first paragraph in this example with 0.95 part by volume of benzyl chloride in 10 parts by volume of ethanol for 12 hours and adding ethyl acetate to the solution, there is obtained methylene-bis-[benzyl-(4-cyclohexyl)-dimethylammonium chloride] in a syrupy state. By redissolving in alcohol, precipitating with ethyl acetate several times and drying, the quaternary amine salt is obtained in a non-crystalline form. It is freely soluble in water and has the formula:

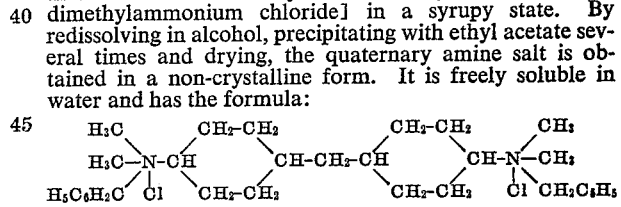

Example 11

5 parts by weight of the hydrogenated base obtained as described in Example 10 are refluxed with 6.1 parts by weight of p-chlorobenzyl chloride in 25 parts by volume of ethanol for four hours. Eethyl acetate is added to precipitate the non-crystalline methylene-bis-[p-chlorobenzyl-(4-cyclohexyl)-dimethylammonium chloride].

To 1 part by weight of the latter substance, dissolved in 5 parts by volume of ethanol, is added 1 part by weight of sodium iodide in 50 parts by volume of ethanol. The crystalline iodide immediately separating is filtered, washed with a small amount of water to remove the sodium chloride and recrystallized from water to yield methylene - bis - [p - chlorobenzyl - (4 - cyclohexyl)-dimethylammonium iodide], which melts at 197–200° (with decomposition) of the formula:

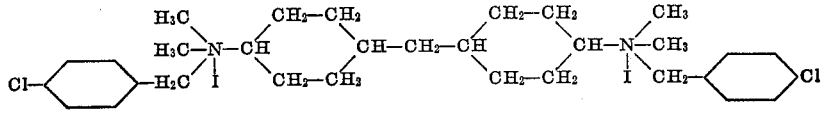

Having thus disclosed the invention, what is claimed is:
1. A bis quaternary ammonium salt which corresponds to the formula

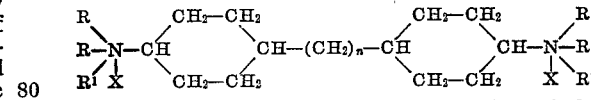

wherein R stands for a lower alkyl group, R¹ stands for a member selected from the class consisting of lower alkyl and aralkyl groups, X represents a member selected from the group consisting of chlorine, bromine and iodine, and n stands for one of the numbers 0, 1 and 2.

2. (Bicyclohexyl) - 4,4' - bis - (trialkylammonium halide), the several alkyl groups being lower alkyl, and the halogen atoms having an atomic weight between about 35 and about 127.

3. Methylene - bis - [(4 - cyclohexyl) - trialkylammonium halide], the several alkyl groups being lower alkyl, and the halogen atoms having an atomic weight between about 35 and about 127.

4. Ethylene - bis - [(4-cyclohexyl) - trialkylammonium halide], the several alkyl groups being lower alkyl, and the halogen atoms having an atomic weight between about 35 and about 127.

5. (Bicyclohexyl) - 4,4' - bis - (aralkyldialkylammonium halide), the several alkyl groups being lower alkyl, and the halogen atoms having an atomic weight between about 35 and about 127.

6. Methylene - bis - [aralkyl - (4 - cyclohexyl) - dialkylammonium halide], the several alkyl groups being lower alkyl, and the halogen atoms having an atomic weight between about 35 and about 127.

7. (Bicyclohexyl) - 4,4' - bis - (trimethylammonium iodide).

8. Methylene - bis - [(4 - cyclohexyl) - trimethylammonium iodide].

9. Ethylene - bis - [(4 - cyclohexyl) - trimethylammonium iodide].

10. Bicyclohexyl - 4,4' - bis - benzyldimethylammoium bromide).

11. Lower alkylene bis-[(4-cyclohexyl)-tri lower alkyl ammonium halide].

No references cited.